(12) United States Patent
McIntire et al.

(10) Patent No.: US 7,612,711 B1
(45) Date of Patent: Nov. 3, 2009

(54) SYSTEM AND METHOD FOR COMMUNICATING LOW DATA RATE INFORMATION WITH A RADAR SYSTEM

(75) Inventors: William K. McIntire, Sandy, UT (US); Larry S. Thomson, Bountiful, UT (US); David H. Robbins, Bountiful, UT (US); James J. Boesch, Salt Lake City, UT (US)

(73) Assignee: L-3 Communications, Corp., New York, NY (US)

(*) Notice: Subject to any disclaimer, the term of this patent is extended or adjusted under 35 U.S.C. 154(b) by 0 days.

(21) Appl. No.: 12/436,311

(22) Filed: May 6, 2009

Related U.S. Application Data

(62) Division of application No. 11/592,537, filed on Nov. 3, 2006, now Pat. No. 7,545,309.

(60) Provisional application No. 60/733,859, filed on Nov. 3, 2005.

(51) Int. Cl.
*G01S 13/00* (2006.01)
*G01S 1/00* (2006.01)
*H04M 1/00* (2006.01)

(52) U.S. Cl. ............... 342/195; 342/357.12; 455/553.1

(58) Field of Classification Search ............... 342/195, 342/357.12; 455/553.1
See application file for complete search history.

(56) References Cited

U.S. PATENT DOCUMENTS

| | | | |
|---|---|---|---|
| 2,980,903 A | 4/1961 | Hagopian et al. | |
| 3,460,139 A | 8/1969 | Rittenbach | |
| 3,550,124 A | 12/1970 | Heft et al. | |
| 3,946,384 A | 3/1976 | Westaway | |
| 4,458,246 A | 7/1984 | Filipsson et al. | |
| 4,510,595 A | 4/1985 | Glance et al. | |
| 4,733,238 A | 3/1988 | Fiden | |
| 4,954,829 A | 9/1990 | Fiden | |
| 5,535,239 A | 7/1996 | Padovani et al. | |
| 5,917,430 A | 6/1999 | Greneker, III et al. | |
| 6,205,190 B1 | 3/2001 | Antonio et al. | |
| 6,469,653 B1 | 10/2002 | Haynes | |
| 6,606,033 B1 | 8/2003 | Crocker et al. | |
| 7,053,797 B2 | 5/2006 | Taylor | |
| 7,089,033 B2 * | 8/2006 | Leinonen et al. | ......... 455/553.1 |
| 7,102,536 B2 | 9/2006 | Scholz | |
| 7,113,107 B2 | 9/2006 | Taylor | |
| 2003/0063583 A1 | 4/2003 | Padovani et al. | |

(Continued)

OTHER PUBLICATIONS

U.S. Appl. No. 11/592,537, filed Nov. 3, 2006, McIntire.

*Primary Examiner*—Thomas H Tarcza
*Assistant Examiner*—Harry Liu
(74) *Attorney, Agent, or Firm*—Kirton & McConkie; William T. Ralston

(57) ABSTRACT

A method is disclosed for transmitting low data rate symbols from a communications terminal to a burst radar transceiver. A plurality of bursts can be emitted from a burst radar transceiver, each burst having a burst interval and separated by an inter-burst interval. A symbol can be transmitted from the communications terminal to the burst radar transceiver. The symbol has a symbol period that is substantially longer than a radar transceiver burst period comprising the burst interval and the inter-burst interval. Symbol energy can be accumulated during inter-burst intervals at the burst radar transceiver over a plurality of burst periods for approximately the symbol period.

11 Claims, 6 Drawing Sheets

U.S. PATENT DOCUMENTS

| | | |
|---|---|---|
| 2003/0231702 A1 | 12/2003 | Oates et al. |
| 2004/0028121 A1 | 2/2004 | Fitton |
| 2004/0032354 A1* | 2/2004 | Knobel et al. ............... 341/133 |
| 2004/0239559 A1* | 12/2004 | King et al. ............. 342/357.12 |
| 2004/0240476 A1 | 12/2004 | Joshi |
| 2005/0220051 A1 | 10/2005 | Lavean |
| 2006/0023629 A1 | 2/2006 | Kim et al. |
| 2007/0016654 A1 | 1/2007 | Bowles et al. |

* cited by examiner

SYSTEM AND METHOD FOR COMMUNICATING LOW DATA RATE INFORMATION WITH A RADAR SYSTEM

CROSS-REFERENCE TO RELATED APPLICATIONS AND CLAIM OF PRIORITY

This application is a divisional of U.S. patent application Ser. No. 11/592,537, filed Nov. 3, 2006, which claims priority of U.S. Provisional patent application Ser. No. 60/733,859, filed on Nov. 3, 2005, each of which are herein incorporated by reference in their entirety.

BACKGROUND

Advancements in broadband wireless communication have changed the way we live. People can now communicate and transfer information using techniques that were thought of only in science fiction literature a half century ago. A wide variety of communication resources is available for consumers, businesses, government, and military. For example, a typical consumer traveling in his car can communicate using his cell phone, listen to music over a virtually uninterrupted digital satellite radio signal while traveling cross country, receive broadband data at his computer over a WiMAX connection, and listen to a local traffic report using a high definition radio receiver.

Unfortunately, each of these means of communication typically requires the use of a separate antenna. It is very possible that a typical car, in the next 10 to 20 years, may include five to ten different antennas. Placement of that number of antennas on a car can be difficult, from both a stylistic and a functional point of view. Not only can the antennas appear unsightly, but they can also cause interference with other antennas, as well as requiring expensive wiring within the automobile between each antenna and its associated receiver.

Placement of antennas on commercial and military mobile platforms can be even more challenging. Even large military ships are often limited in the types of communication they can receive due to a lack of space available for associated antennas. Aircraft can be similarly limited. An aircraft designed to travel at high speeds may not have room for, or tolerance for an antenna designed for communicating high speed data over large distances. To overcome this problem, the military uses specialized ships and aircraft for transmitting and relaying information. While this solution generally works, it can be extremely expensive and can increase risk for soldiers in the battlefield.

SUMMARY

A method is disclosed for transmitting low data rate symbols from a communications terminal to a burst radar transceiver. A plurality of bursts can be emitted from a burst radar transceiver, each burst having a burst interval and separated by an inter-burst interval. A symbol can be transmitted from the communications terminal to the burst radar transceiver. The symbol has a symbol period that is substantially longer than a radar transceiver burst period comprising the burst interval and the inter-burst interval. Symbol energy can be accumulated during inter-burst intervals at the burst radar transceiver over a plurality of burst periods for approximately the symbol period.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
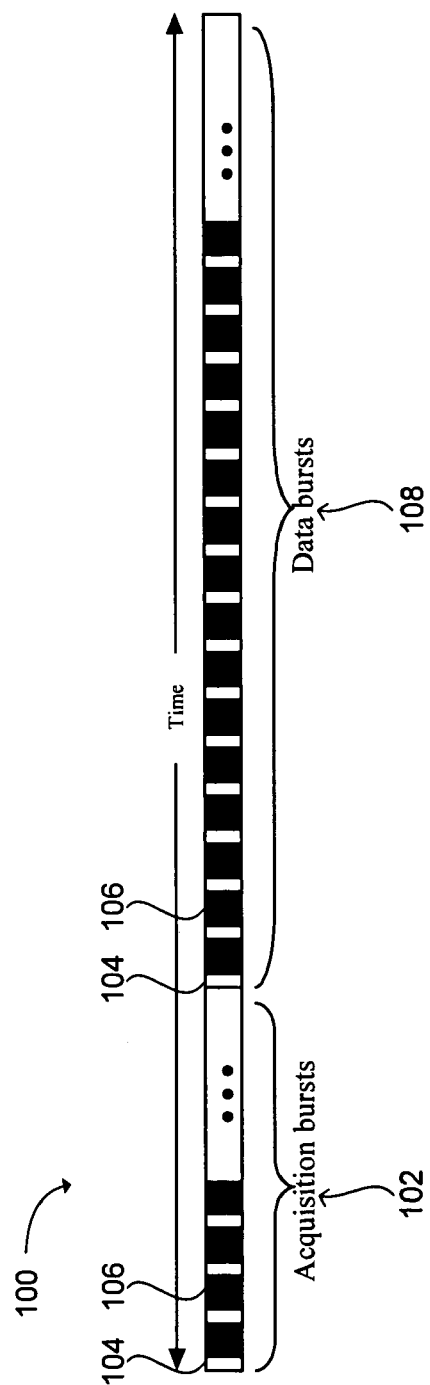
FIG. 1 is a block diagram illustrating a burst radar transmission comprising a continuous communication signal broken into segments in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

One method for overcoming the electrical, spatial, and/or mechanical limitations inherent in the use of multiple antennas on a single platform is to use an antenna for multiple purposes. For example, an antenna designed for transmitting and receiving radar bursts can also be used to transmit and receive data.

A mobile platform or fixed installation containing a radar system may not have a data communications system, or the existing communication system may be insufficient for the needs of the platform. Adding or upgrading a communication system typically entails adding hardware which incurs cost, adds weight, and involves modification of the platform structure (mounting antennas, for example). These additional requirements could be reduced or eliminated if components of the radar system could be exploited for use in data communications.

For example, an aircraft may be configured with a high performance radar which is capable of collecting synthetic aperture radar (SAR) images. Synthetic aperture radar can provide detailed, high definition images. Without a high bandwidth data link, these images typically cannot be downloaded from the aircraft until the aircraft has landed. The addition of a high-speed data communications link would allow the image to be downloaded to a ground or airborne platform, or transmitted to a satellite while the aircraft is still in flight.

A two way data link using a radar system can enable a mobile radar platform to both send and receive data. A two way data link can enable critical data to be transmitted to a mobile platform that otherwise lacks the ability to receive such data. The two way data link using a radar system may also provide a higher data rate link than other communications links on the mobile platform, enabling greater amounts of data to be received than is otherwise possible. Additionally, a two way data link can improve downlink communications from the mobile platform to a receiver by enabling communication between the radar system and the receiver, such as an acknowledgement that data sent by the radar was received by the receiver.

Some radar equipment (due, for example, to thermal constraints) cannot operate continuously, and is only capable of transmitting short bursts. This is true in the case of radars installed on certain aircraft today. The radar bursts, which can be as short as several hundred nanoseconds or as long as several hundred microseconds, can still be used to carry data despite the relatively short interval of each burst. Ordinarily, data links configured to transmit large amounts of data use a continuous data signal. Transmitting large amounts of data using a bursted radar signal having short interval bursts requires a different solution, since large data files, such as high definition photographs, cannot be transmitted over a single burst.

To enable a radar transmitter to transmit the continuous data signal in discrete bursts, the communication signal can be broken into segments. Each segment can be transmitted within the length of the transmit bursts. The maximum length of these bursts will usually be constrained by the radar RF hardware, such as the need for cooling. However, other constraints are also conceivable. Use of a substantially maximum length of each burst to transmit data can be desirable. This burst length, minus any guard intervals allowed at the beginning and end of the burst, can be used to determine the length of the communication signal segments transmitted from the radar transmitter. FIG. 1 shows an example of a burst radar transmission 100 comprising a continuous communication signal broken into segments.

The burst radar transmission 100 can be configured to carry data at high data rates. The transmission can includes a plurality of bursts, with each burst having a burst transmit interval 104 followed by an inter-burst interval 106 during which the radar equipment can cool. The inter-burst interval can be several times as long as the transmit interval. The length of the burst transmit interval in relation to the sum of the burst transmit interval and the inter-burst interval is known as the duty cycle. For example, when the inter-burst interval is twice as long as the transmit interval, the radar transmit duty cycle is ⅓, with one interval of the radar transmitter "on" followed by two intervals of the radar transmitter being "off", for a total of three intervals. The actual duty cycle of a radar transmitter can vary, depending on the characteristics of the hardware and data link management issues, as can be appreciated.

The burst radar transmission can include one or more acquisition bursts 102. The acquisition bursts can include training sequences, frame synchronization sequences, and other sequences useful in synchronizing a receiver with the burst transmissions. The acquisition burst(s) can be followed by payload (data) bursts, configured to carry data at relatively high rates. This is discussed more fully in the copending application Ser. No. 11/592,536 (now U.S. Pat. No. 7,423,577), titled "System and Method for Transmitting High Data Rate Information from a Radar System", which is herein incorporated by reference in its entirety.

Synchronization with Radar Hardware

A modem is typically used to modulate data onto a carrier signal to form a communication signal. It is convenient if the modem is able to control the timing of the transmit intervals in the RF hardware. This way, synchronization of the communication signal segments with the radar burst transmit intervals 104 is easily accomplished. In some cases, however, this is not possible. Certain modern radar systems in use today present just such a case, wherein the radar cannot accept control of the transmit intervals from an external source. In this case, the radar hardware can provide some sort of gate signal so that the radar modem can know the timing of the transmit burst intervals. The radar hardware may also provide a reference clock signal to which the gate signal is synchronized.

Figure 2:
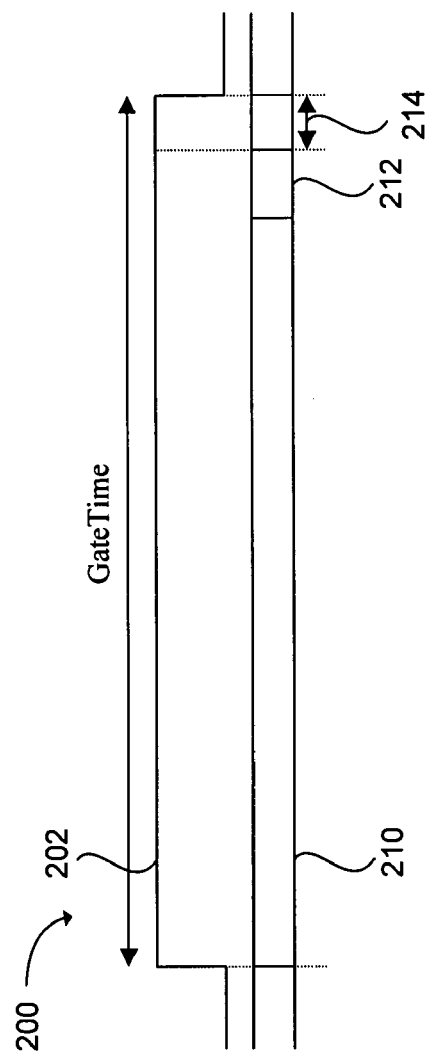
FIG. 2 is a block diagram illustrating a burst radar transmission comprising an acquisition signal segment in accordance with an embodiment of the present invention.

FIG. 2 shows one embodiment of a gate signal 202. The gate signal 202 can be provided by the RF hardware to the modem. An acquisition signal segment 200 can be synchronized to the gate signal. The gate signal may be continuously provided by the RF hardware to the modem. Alternatively, a reference clock can be provided by the radar radio frequency equipment (RFE) or some other source within the RF hardware. The gate signal can be made synchronous with this reference clock signal. The communications modem can therefore use this clock for a reference, and upon receiving any gate signal rising edge, the modem can predict future rising and falling edges by counting clock cycles, without the need for further gate signal detection.

The acquisition signal segment 200 can include an idle sequence 210 that can be transmitted during the acquisition burst to enable carrier and symbol acquisition. The idle sequence can be a sequence well suited for rapid acquisition, such as an alternating +1, −1 sequence, or some other alternating sequence configured to enable rapid acquisition. Additionally, a stop frame sync word 212 can be included at the end of the acquisition burst to signal an end of the burst. A separate communications terminal, at which the acquisition signal is received, can acquire the burst timing by detecting the stop frame sync word. A guard period 214 can be located between the stop sequence and the end of the acquisition burst. The guard period can be just long enough to ensure that the tail of the data doesn't get clipped.

The radar system can be configured to receive data and/or radar signals during the inter-burst interval 106 (FIG. 1). For example, radar bursts can be transmitted during the radar burst transmit intervals 104. Reflections from the radar bursts can be received during the inter-burst intervals. Alternatively, data can be transmitted during the radar burst transmit intervals and data can be received during the inter-burst intervals that has been transmitted from the separate communications terminal. However, as previously discussed, the modem may have no control over the timing of the inter-burst intervals. The modem may only be able to receive data during the inter-burst interval. Thus, any information that is transmitted from a separate communications terminal to the radar system transceiver is typically received only during the inter-burst intervals.

Figure 3:
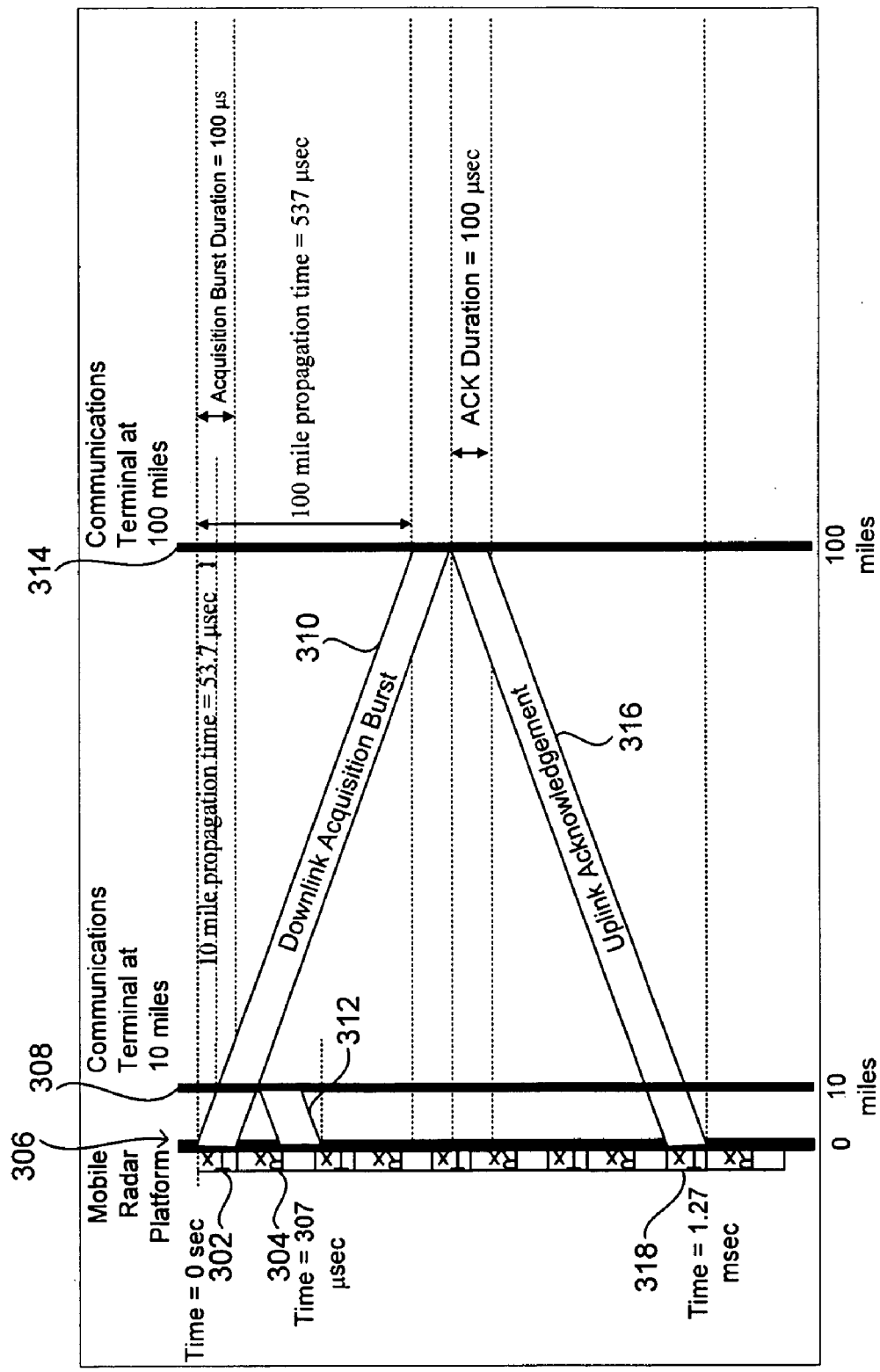
FIG. 3 is an illustration showing the difficulty of transmitting a signal from a mobile radar platform to a communications terminal and transmitting a signal back to the radar platform to be received during an inter-burst period in accordance with an embodiment of the present invention.

For example, FIG. 3 is an example diagram depicting the difficulty of achieving two way communications between a radar transceiver having an inter-burst interval and a separate communications terminal. The left axis shows transmit periods 302 and receive periods 304 (inter-burst intervals) of the burst radar transceiver as time progresses. The transmit period is shown to be 100 μs followed by a 200 μs receive period in this example. A 100 μs communication burst can be transmitted from the burst radar transceiver 306 to a communications terminal 308 that is located approximately 10 miles from the radar transceiver. The communication burst, such as an acquisition burst 310, will take approximately 53.7 μs to travel the 10 miles through the atmosphere to the communications terminal, as can be appreciated. The communications terminal is shown immediately responding, after receiving the acquisition burst, with a 100 μs acknowledgement burst 312. It can be seen that the acknowledgement burst will be received at the radar transceiver (53.7 μs after leaving the communications terminal), with a portion of the acknowledgement burst arriving during the following transmit period. Specifically, the diagram shows the acknowledgement burst arriving at the radar transceiver between 207 μs and 307 μs after the start of the acquisition signal. The last 7 μs of the acknowledgement burst will arrive during a transmit period, at which point the radar transceiver may not be able to receive the signal.

Similarly, if the 100 μs acquisition burst 310 is sent from the burst radar transceiver 306 to a communications terminal 314 that is located approximately 100 miles from the transceiver, the propagation time is 537 μs. A substantially immediate response of a 100 μs acknowledgement burst 316 by the communications terminal takes 537 μs to return to the radar transceiver, arriving between 1.17 ms and 1.27 ms after the start of the acquisition signal, with substantially all of the signal arriving during the 1.20 ms to 1.30 ms transmit period 318. In accordance with one aspect of the invention, it has been recognized that a system and method is needed for transmitting bursts of data from a communications terminal to a burst radar transceiver having inter-burst intervals.

In one embodiment, a communications terminal can transmit information that can be received by a burst radar transceiver using a signal having a symbol period, or symbol duration, that is significantly longer than the burst radar transceiver burst periods. When the symbol period is significantly longer than the burst radar transceiver burst periods then the communications terminal and burst radar transceiver do not have to be synchronized in order to communicate. For example, FIG. 4 is an illustration of a timing diagram 400 displaying a communications terminal data signal 402, a burst radar transceiver signal 404, and a chart 406 showing accumulation 408 of energy over time at a radar receiver of the burst radar transceiver.

Figure 4:
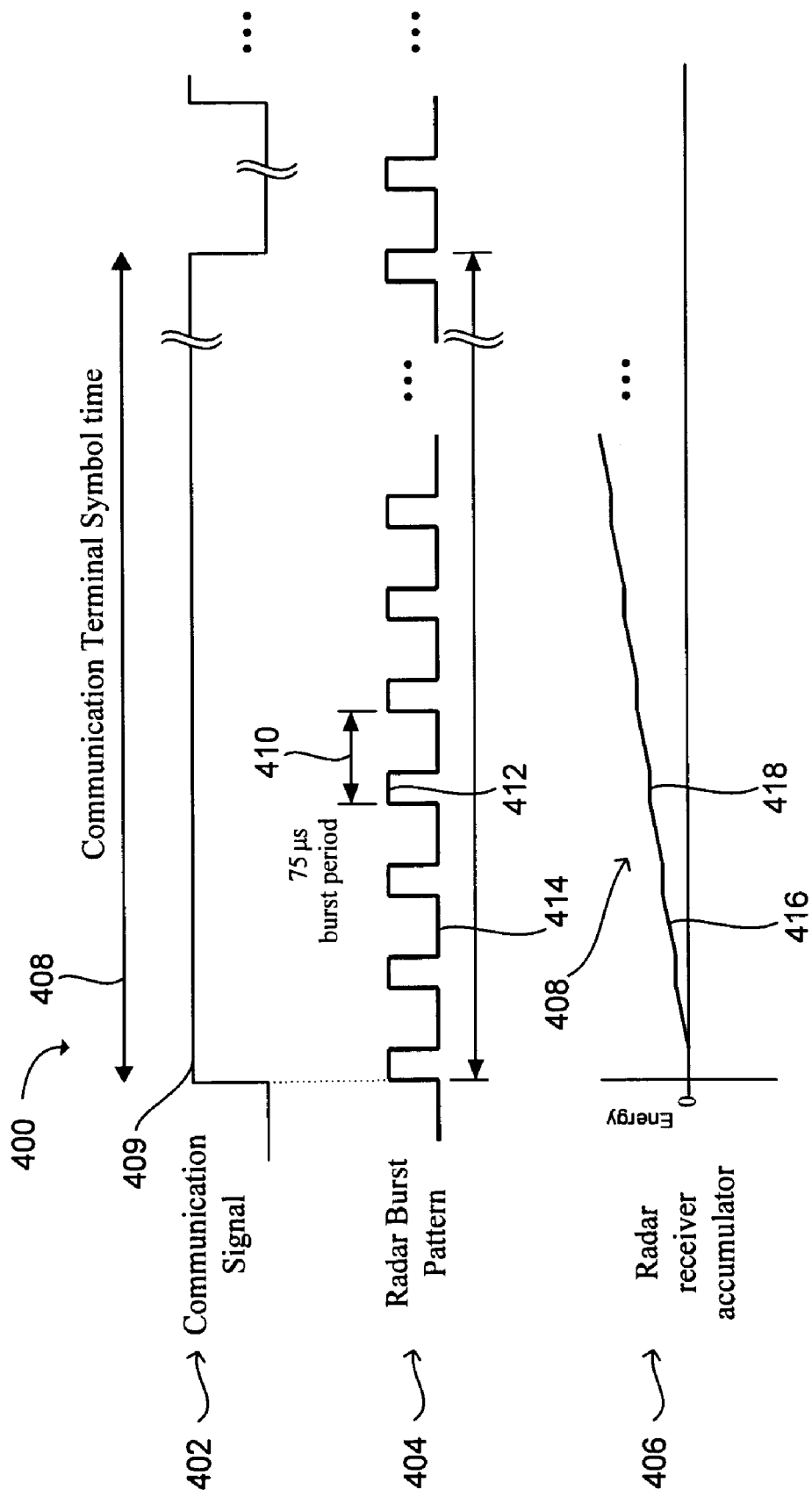
FIG. 4 is an illustration for transmitting a low data rate communications signal from a communications terminal to a radar transceiver in accordance with an embodiment of the present invention.

In the example of FIG. 4, a signal 402 is transmitted from the communications terminal carrying a symbol 409 having information encoded thereon. The symbol has a symbol period 408 that is substantially greater than the burst period 410 of the burst radar transceiver output 404. The burst period of the burst radar transceiver comprises a burst 412 interval and the inter-burst 414 interval. Transmitting for a symbol period that is much greater than the burst period of the radar transceiver enables the symbol to be received at the radar transceiver without being completely blocked during a radar burst transmission. The longer the symbol period of the communications signal relative to the radar burst period, the simpler it is to detect the symbol at the receiver and identify the information in the symbol.

Transmission of signals having shorter symbol periods can be accomplished, but can require increased complexity. For example, transmission of data from the communications terminal to the burst radar transceiver can be completed using symbols having a symbol period shorter than the radar burst period if forward error correction coding is used. For example, a block error correction code such as a Reed Solomon code may be used to encode the symbol. Depending on the type of forward error correction code being used, the information in transmitted symbols can be detected even when only a portion of the transmitted signal is received at the burst radar transceiver.

With a continuous signal being transmitted by the conventional receiver, the radar receiver at the burst radar transceiver can integrate the received value for approximately the duration of each transmitted symbol. The exact amount of time during which the received signal is integrated can vary based on the start and stop time of the symbol. Because the low-data-rate signal transmitted from the communications terminal is not synchronized with the burst transmission timing at the burst radar transceiver, it is possible that signal transitions can occur in the middle of inter-burst intervals. Should this occur, the integration of the received signal may occur for a period of time that is slightly less than or greater than the actual symbol timing. This can cause the expected signal energy to be received over the symbol period to be slightly different than is expected. The longer the symbol period of the communications signal relative to the radar burst period, the less the expected energy in each symbol will be affected by unsynchronized start and stop times and the better the signal to noise ratio will be (SNR).

Radar transmitters usually transmit at a much greater power level than the power of the signal received at the radar receiver. Radar receivers are typically "blanked" or turned off during radar burst transmission to avoid interference between the transmitter and receiver, which can potentially overwhelm the low power received signal. This is especially true when the radar transmitter and receiver operate at the same frequency, though transmitters at sufficiently high power can even cause interference in receivers that operate at different frequencies.

Blanking, or turning off the receiver, can occur in a variety of ways. The receiver may be physically or electrically isolated from the radar antenna. For example, a physical switch can be used to switch a path between the radar antenna and the radar receiver. Electrical isolation can occur by switching an electrical path, such as a transistor or diode, between the radar antenna and the radar receiver. Alternatively, the signal can be received over the burst and inter-burst periods. The received signal during the inter-burst periods can then be separated from the received period during the burst periods using software or hardware. For example, energy received during burst intervals can be substantially eliminated at the modem. Blanking the receiver during the burst periods, however it is achieved, can have the affect of increasing signal to noise ratio, since the burst transmission power can be substantially greater than the received signal power.

However, it is possible that some power can bleed through to the receiver even if the receiver is blanked. This would not necessarily prevent the system from working. Such a result can have the effect of reducing the SNR in the receiver, but the signal may still be able to be detected. Excess noise at the receiver, such as noise received during the burst transmission, can be further reduced by turning off or freezing the integrator during the burst periods 412 of the radar transceiver. This can effectively eliminate noise received during the radar burst transmissions.

The chart 406 showing accumulation of energy 408 over time at a radar receiver of the burst radar transceiver illustrates a signal received at the radar receiver of the burst radar transceiver. It is assumed, in this example, that the receiver is totally blanked and/or the integrator is turned off during radar transceiver burst transmissions 412. Thus, as the communications signal is transmitted from the communications terminal, the energy received over the burst period 408 of the symbol 409 increases 416 during inter-burst intervals 414 and stays constant 418 during radar burst transmissions 412.

After the energy has been received for approximately one symbol time 408, a sufficient amount of energy can be received to enable the receiver to identify the information in the symbol based on a characteristic of the accumulated symbol energy. The accumulated symbol energy can characterize information modulated onto a carrier signal by varying at least one of a phase, frequency, and amplitude of the signal and transmitted from the communications platform. This information from the carrier signal can be recovered at the burst radar transceiver by detecting and demodulating the change in phase, frequency, and/or amplitude.

If information is modulated onto the carrier signal using a phase modulation, it may be necessary to include a phase memory in the burst radar transceiver. The phase memory can be used to recall a phase of the signal from one signal section to a following signal section during the inter-burst intervals. However, if there is only a relatively small amount of change in phase between the received signal and a clock reference in the receiver during an inter-pulse interval, it may not be unnecessary to use a phase memory. The amount of change in phase requiring use of a phase memory is dependent upon the hardware characteristics of the communications terminal and burst radar transceiver.

Significant amounts of data can be transmitted from the communications terminal to the burst radar transceiver without the need for synchronization between the communications terminal and burst radar transceiver. For example, the burst transceiver can have a burst period of 75 µs, comprising a burst period of 25 µs and an inter-burst period of approximately 50 µs. If a symbol is transmitted from the communications terminal during every burst period at the radar transceiver, a theoretical data rate of 13.33 kb/s can be achieved. Even assuming that a symbol is transmitted from the communications terminal that has a symbol period equivalent to 10 symbol bursts, a theoretical data rate of 1.33 kb/s can be achieved. These data rate can be increased even higher using modulation schemes that enable multiple bits to be transmitted over one symbol, such as quadrature phase shift keying, 8PSK, and so forth. The actual number of bursts used to receive each symbol can be dependent on the type of transmitter available to communicate with the burst radar transceiver. For example, a first communications terminal may transmit a symbol every 5 bursts and a second communications terminal may transmit a symbol every two bursts.

Figure 5:
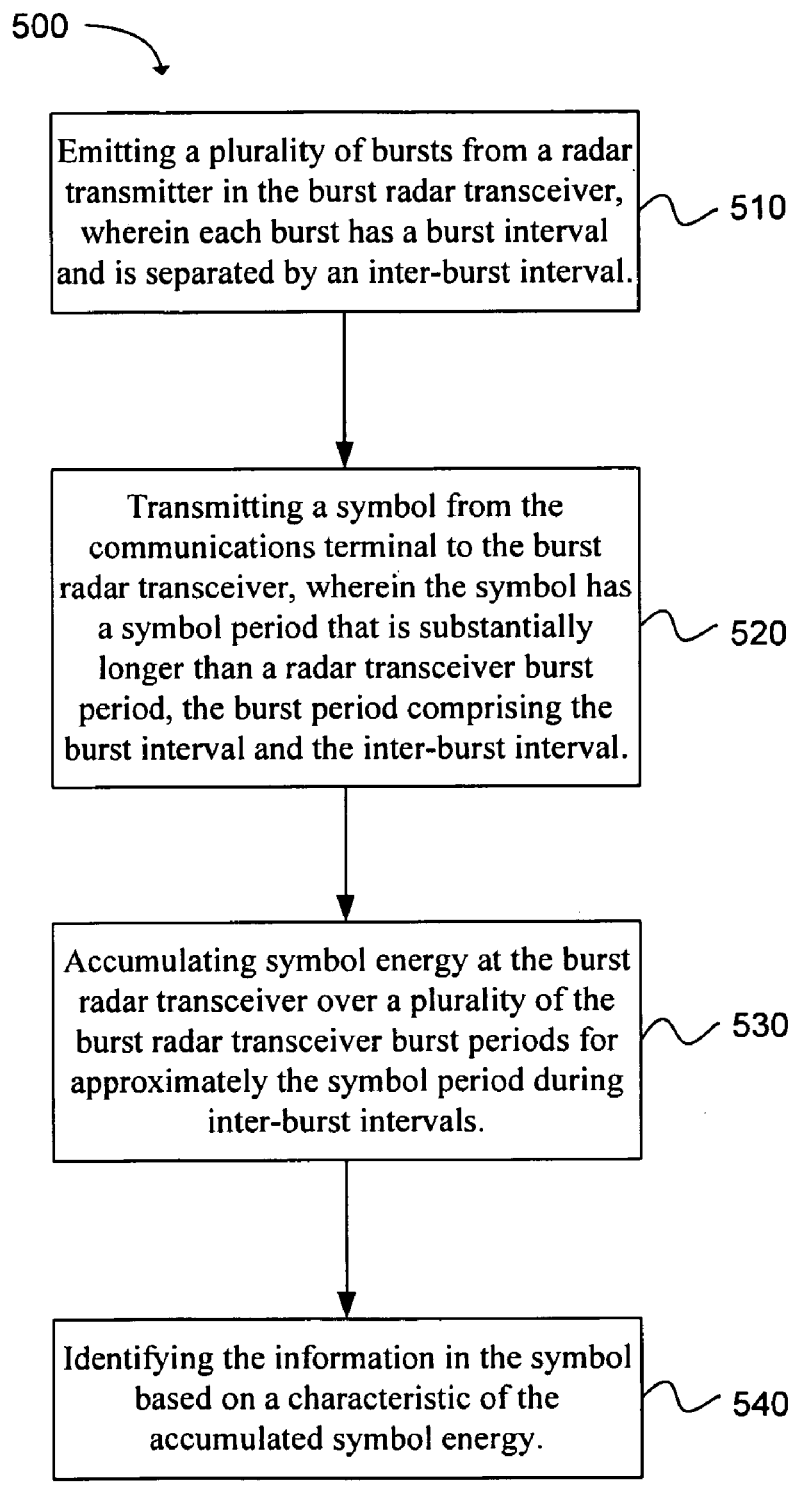
FIG. 5 is a flow chart depicting a method for transmitting low data rate symbols from a communications terminal to a burst radar transceiver in accordance with an embodiment of the present invention.

Another embodiment provides a method 500 for transmitting low data rate symbols from a communications terminal to a burst radar transceiver, as depicted in the flow chart of FIG. 5. The method includes the operation of emitting a plurality of bursts from a radar transmitter in the burst radar transceiver, wherein each burst has a burst interval and is separated by an inter-burst interval, as shown in block 510. A further operation involves transmitting a symbol from the communications terminal to the burst radar transceiver, wherein the symbol has a symbol period that is substantially longer than a radar transceiver burst period, the burst period comprising the burst interval and the inter-burst interval, as shown in block 520. The symbol can have information encoded thereon.

The method 500 further provides accumulating symbol energy during inter-burst intervals at the burst radar transceiver over a plurality of the burst radar transceiver burst periods for approximately the symbol period, as shown in block 530. A radar receiver at the burst radar transceiver can be blanked during the radar burst intervals. An integrator can be used to accumulate the symbol energy, as can be appreciated. The integrator can be frozen during the burst intervals. In one embodiment, the radar receiver can be blanked and the integrator can be frozen. Alternatively, only one of these methods can be used to reduce interference at the receiver.

The method additionally includes the operation of identifying the information in the symbol based on a characteristic of the accumulated symbol energy, as shown in block 540. The information can be identified based on a change in phase, amplitude, or frequency, or some combination of these, that occurs over the symbol period.

Figure 6:
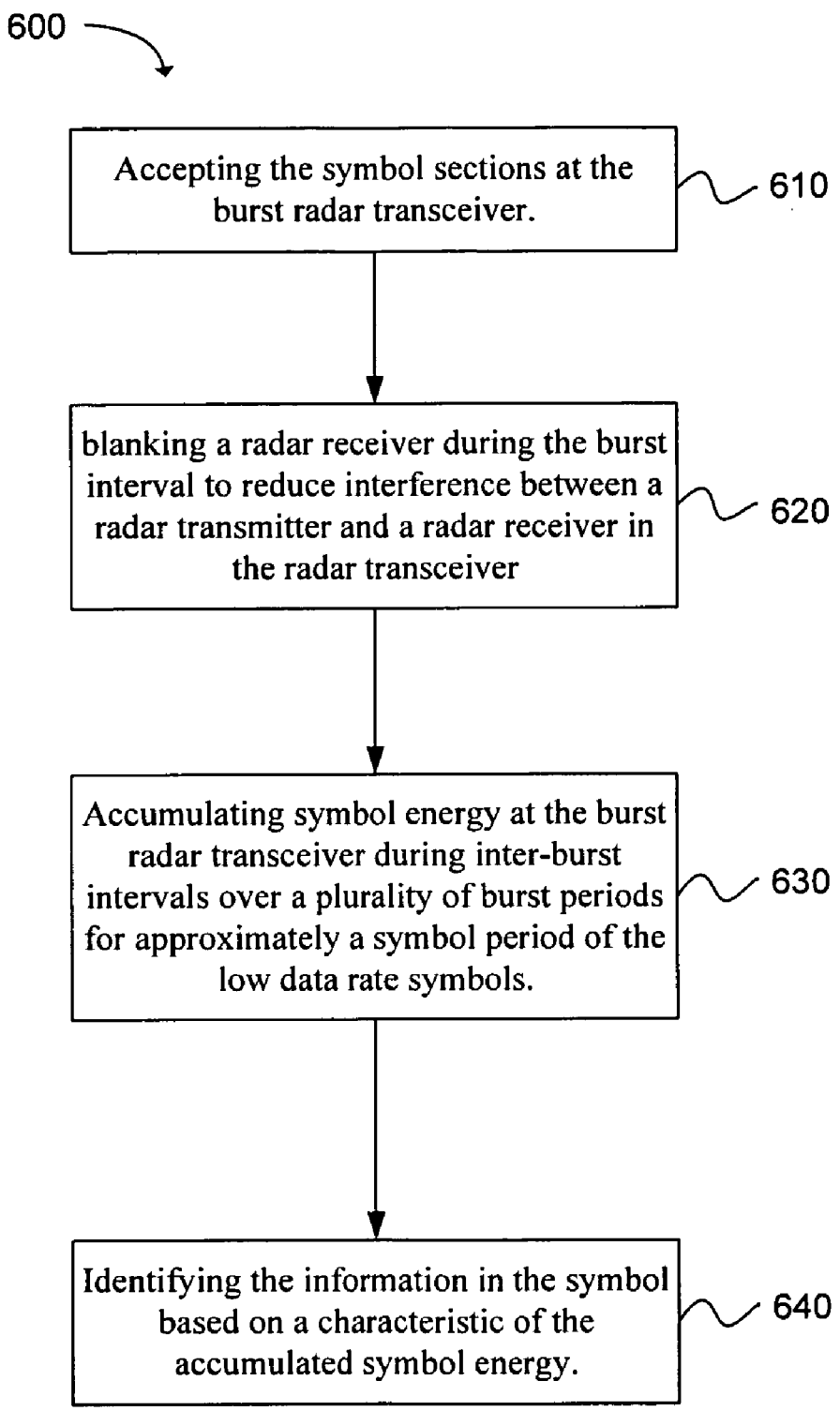
FIG. 6 is a flow chart depicting a method for receiving low data rate symbols in accordance with an embodiment of the present invention.

An additional embodiment provides a method 600 for receiving low data rate symbols, as depicted in the flow chart of FIG. 6. The symbols can have information encoded therein. The symbols can be received at the burst radar transceiver. The symbols can have a burst period including a burst interval and an inter-burst interval. The method includes the operation of accepting the symbol sections at the burst radar transceiver, as shown in block 610. A further operation includes blanking a radar receiver during the burst interval to reduce interference between a radar transmitter and a radar receiver in the burst radar transceiver, as shown in block 620. Blanking the radar receiver during the radar burst interval can reduce the amount of interference received by the radar receiver, which can improve the SNR of the received signal.

A further operation involves accumulating symbol energy at the burst radar transceiver during inter-burst intervals over a plurality of burst periods for approximately a symbol period of the low data rate symbols, as shown in block 630. An additional operation includes identifying the information in the symbol based on a characteristic of the accumulated symbol energy, as shown in block 640.

Figure 7:
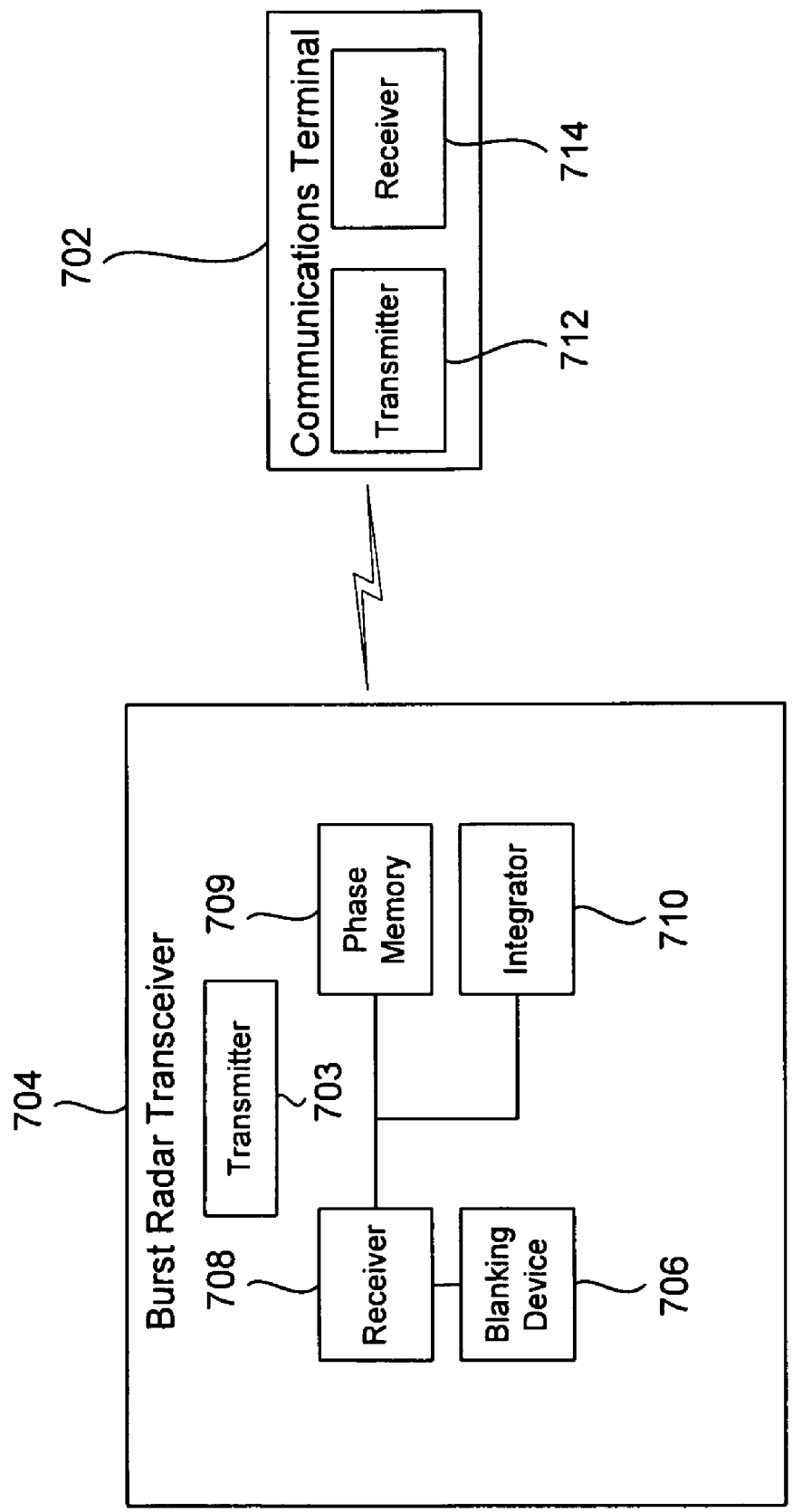
FIG. 7 is a block diagram illustrating a system for transmitting low data rate symbols to a burst radar transceiver in accordance with an embodiment of the present invention.

In another embodiment, a system for transmitting 712 low data rate symbols from a communications terminal 702 to a burst radar transceiver 704 is disclosed, as shown in FIG. 7. The communications terminal can include a transmitter 712 and a receiver 714. The burst radar transceiver can also include a transmitter 703 and a receiver 708. The burst radar transceiver can emit a signal having a burst period. The burst period can include a burst interval and an inter-burst interval. The communications terminal can be configured to transmit a plurality of symbols to the burst radar transceiver. Each symbol can have a symbol period that is substantially longer than the radar transceiver burst period, as previously discussed.

A blanking device 706 can be coupled to a receiver 708 in the burst radar transceiver 704. The blanking device is configured to substantially attenuate any signal received during the burst radar transceiver burst interval. An integrating device 710 can also be coupled to the radar receiver in the burst radar transceiver. As previously discussed, the integrating device can be configured to accumulate symbol energy at the burst radar transceiver over a plurality of burst periods during inter-burst intervals at the radar transceiver. Over a period of approximately one received symbol, the integrator can receive sufficient energy to enable the receiver to identify information that was previously modulated in the symbol. The information can identified based on a characteristic of the accumulated symbol energy, such as a change in at least one of phase, amplitude, and frequency.

If information is modulated onto the carrier signal using a phase modulation, it may be necessary to include a phase memory in the communications terminal receiver. The phase memory can be used to cause the phase shift from one symbol section to a following symbol section during the inter-burst intervals to be the same as it would have been had the signal been continuous through the same interval. However, if there is only a relatively small amount of error in phase between the received signal and a clock reference in the receiver during an inter-burst interval, it may not be necessary to use a phase memory. The amount of error in phase requiring use of a phase memory is dependent upon the hardware characteristics of the communications terminal and burst radar transceiver. A phase memory 709 can be coupled to the receiver to enable the receiver to ensure, at an end of a first burst period of the received signal, a correct phase at a beginning of a second burst period separated from the first burst period by the inter-burst interval.

Transmitting low data rate information through transmission of low frequency symbols having symbol periods substantially longer than a radar transceiver burst period can enable data to be transmitted to a burst radar transceiver without requiring synchronization of the transmitter with the burst radar transceiver.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for receiving low data rate symbols, the symbols having information encoded therein, the symbols being received at a burst radar transceiver having a burst period including a burst interval and an inter-burst interval, comprising:
   - accepting the symbol sections at the burst radar transceiver;
   - blanking a radar receiver during the burst interval to reduce interference between a radar transmitter and a radar receiver in the burst radar transceiver;
   - accumulating symbol energy at the burst radar transceiver during inter-burst intervals over a plurality of burst periods for approximately a symbol period of the low data rate symbols; and
   - identifying the information in the symbol based on a characteristic of the accumulated symbol energy.

2. A system for transmitting low data rate symbols to a burst radar transceiver having a burst period including a burst interval and an inter-burst interval, comprising:
   - a communications terminal configured to transmit a plurality of symbols to the burst radar transceiver, wherein each symbol has a symbol transmission period that is substantially longer than the radar transceiver burst period;
   - a blanking device coupled to the burst radar transceiver configured to substantially attenuate a received signal during the burst radar transceiver burst interval; and
   - an integrating device configured to accumulate symbol energy at the burst radar transceiver over a plurality of burst periods during inter-burst intervals.

3. A system as in claim 2, wherein the communications terminal includes a transmitter and a receiver.

4. A system as in claim 2, wherein the burst radar transceiver includes a transmitter and a receiver.

5. A system as in claim 4, wherein the blanking device is configured to attenuate a signal to the receiver using at least one of a physical switch and an electronic switch.

6. A system as in claim 4, wherein the blanking device is configured to substantially eliminate digital data received during a burst interval.

7. A system as in claim 4, wherein the receiver is configured to identify information in the symbol based on a characteristic of the accumulated symbol energy.

8. A system as in claim 4, further comprising a phase memory configured to enable the receiver to ensure, at an end of a first burst period of the received signal, a correct phase at a beginning of a second burst period separated from the first burst period by the inter-burst interval.

9. A system as in claim 2, wherein the symbol period is greater than one burst period.

10. A system as in claim 2, wherein the symbol period is greater than ten burst periods.

11. A system as in claim 2, wherein the plurality of symbols are encoded using forward error correction coding.

* * * * *